(12) United States Patent
Leterrier

(10) Patent No.: US 11,697,461 B2
(45) Date of Patent: Jul. 11, 2023

(54) REAR CLOSURE SYSTEM OF A MOTOR VEHICLE COMPRISING A REMOVABLE MODULE

(71) Applicant: Compagnie Plastic Omnium, Lyons (FR)

(72) Inventor: Franck Leterrier, Lagnieu (FR)

(73) Assignee: Compagnie Plastic Omnium, Lyons (FR)

( * ) Notice: Subject to any disclaimer, the term of this patent is extended or adjusted under 35 U.S.C. 154(b) by 427 days.

(21) Appl. No.: 16/645,732

(22) PCT Filed: Sep. 6, 2018

(86) PCT No.: PCT/EP2018/074074
§ 371 (c)(1),
(2) Date: Mar. 9, 2020

(87) PCT Pub. No.: WO2019/048581
PCT Pub. Date: Mar. 14, 2019

(65) Prior Publication Data
US 2020/0298916 A1    Sep. 24, 2020

(30) Foreign Application Priority Data
Sep. 8, 2017  (FR) ...................................... 1758289

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC ........ B62D 37/02; B62D 35/007; B60J 5/106; B60J 5/101

USPC ...................................... 296/180.1, 146.8, 56
See application file for complete search history.

(56) References Cited

U.S. PATENT DOCUMENTS

| | | | | |
|---|---|---|---|---|
| 6,193,302 B1* | 2/2001 | Won | .................... | B62D 37/02 296/180.1 |
| 7,438,347 B2* | 10/2008 | Froeschle | ............ | B62D 35/007 296/180.1 |
| 7,481,482 B2* | 1/2009 | Grave | .................. | B62D 35/007 296/180.1 |
| 9,499,217 B2* | 11/2016 | Jeong | .................... | F16H 37/14 |

(Continued)

FOREIGN PATENT DOCUMENTS

| CN | 101585379 A | 11/2009 |
|---|---|---|
| CN | 104828154 A | 8/2015 |

(Continued)

OTHER PUBLICATIONS

International Search Report and Written Opinion dated Nov. 12, 2018 for Application No. PCT/EP2018/074074.

*Primary Examiner* — Jason S Morrow
(74) *Attorney, Agent, or Firm* — Dinsmore & Shohl LLP

(57) ABSTRACT

The invention relates to a rear closure system (2; 102) of a motor vehicle, comprising:
a main body (4; 104), and
a module (10; 110) that can be detached from the main body (4; 104) and can receive a device (24; 124),
the main body (4; 104) comprising a free space (12; 112) accessible through an opening (14; 114), the dimensions of the free space (12; 112) and the opening (14; 114) being such that the module (10; 110) can be inserted into, and removed from, the main body (4; 104).

12 Claims, 4 Drawing Sheets

(56) References Cited

U.S. PATENT DOCUMENTS

| | | | |
|---|---|---|---|
| 9,868,478 B2* | 1/2018 | Kishima | B60Q 1/0017 |
| 9,956,999 B2* | 5/2018 | Crane | B60Q 1/2684 |
| 10,112,658 B2* | 10/2018 | Yoon | B62D 37/02 |
| 10,207,752 B2* | 2/2019 | Causley | B62D 37/02 |
| 10,670,114 B2* | 6/2020 | Herrmann | F16H 1/225 |
| 10,745,067 B2* | 8/2020 | Virdie | B62D 37/02 |
| 2007/0024091 A1 | 2/2007 | Bonneau et al. | |
| 2009/0286461 A1 | 11/2009 | Molnar et al. | |
| 2011/0285168 A1 | 11/2011 | Roemer et al. | |
| 2016/0288775 A1 | 10/2016 | Crane et al. | |
| 2018/0037277 A1 | 2/2018 | Khayat | |
| 2020/0114986 A1* | 4/2020 | Eulalie | B62D 35/007 |
| 2021/0086846 A1* | 3/2021 | Duong | B60R 16/0231 |
| 2021/0139087 A1* | 5/2021 | Promutico | B62D 37/02 |
| 2021/0269102 A1* | 9/2021 | Lindberg | B62D 35/007 |

FOREIGN PATENT DOCUMENTS

| | | |
|---|---|---|
| CN | 204775551 U | 11/2015 |
| DE | 102008062150 A1 | 6/2010 |
| FR | 2874579 A1 | 3/2006 |

* cited by examiner

REAR CLOSURE SYSTEM OF A MOTOR VEHICLE COMPRISING A REMOVABLE MODULE

The invention relates to the rear openings of motor vehicles.

The term rear opening means the rear panel of a motor vehicle capable of opening from top to bottom or from bottom to top.

Rear openings are known comprising an aerodynamic blade, i.e. a transverse body element improving the aerodynamic performance of the vehicle by shifting the air separation points toward the rear of the vehicle. This aerodynamic blade can be either fixed or able to deploy and retract according to different parameters such as the speed of the vehicle and can be actuated by a motorized mechanism.

There are also known movable rear openings between an open position and a closed position, the opening and closing movements of which are provided by a motorized mechanism.

In the two cases shown above, the various elements mentioned above can be placed at the spoiler of the rear opening. A spoiler is a body part forming an extension of the roof positioned on the rear of a vehicle and intended to improve the aerodynamic performance of the vehicle on which this part is placed. The spoilers are also used for aesthetic aspects (style) of the vehicle. They are located and fixed in the upper rear part of the vehicle between the roof and the upper edge of the window, on the rear opening in our case.

The spoiler can be formed by an external panel located in the upper zone of the rear opening, called "upper panel," said panel being fixed to the lining of the rear opening (for example by gluing) (i.e. the part forming the internal part or rear opening lining. An internal free space can be formed by the meeting of the upper panel and the lining. It is in this free space that various devices will be placed that are made of the elements and mechanisms mentioned above—mobile aerodynamic blade, motorized mechanisms, etc.).

However, the rear opening obtained has some drawbacks.

Indeed, it is possible that a device mounted in the free space is defective. It would then be necessary, in order to repair or replace it, to detach the upper panel from the lining and then, after repair or replacement, to reconnect the upper panel to the lining while retaining an optimal aesthetic appearance. These actions at a minimum are very difficult if not impossible to perform during repair work in a car garage. In the event of an attempted repair, the repair will also be expensive in addition to the high probability of losing an optimal aesthetic appearance. On the other hand, in the event of impacts with another vehicle or an obstacle causing damage to the rear opening, the latter is fully replaced and the devices integrated into it are discarded. These two scenarios have a relatively high cost.

An object of the invention is therefore to provide a rear opening in which access to the devices located at the spoiler of the motorized rear opening is simplified.

To this end, the invention has as its object a rear opening of a motor vehicle comprising:
 a main body, and
 a module removable relative to the main body capable of accommodating a device, the main body comprising a free space accessible by an opening, the free space and the opening being sized to allow the insertion and removal of the module into and from the main body.

Thus, access to the devices contained in the module is simplified. Indeed, in the event of a malfunction of the devices contained in the latter it is possible to remove the module from the rear opening in order to carry out various repairs or to replace it. It is therefore no longer necessary to consider dismantling the upper panel at the risk of diminishing the aesthetic appearance of the spoiler or having to replace the entire rear opening.

In the event of shocks that cause damage to the rear opening necessitating its replacement, it is possible to recover the module to easily reuse it instead of throwing it away with the rear opening.

Finally, it is possible to envision functions such as motorized opening of the rear opening or even the presence of a movable aerodynamic blade being options included only if the vehicle's purchaser so wishes. It is then possible to standardize the manufacture of the main body by placing in the empty space an empty module or one containing some or all of the devices mentioned above (mobile aerodynamic blade, motorized opening mechanism of the rear opening). In addition, during the complete assembly of the vehicle it is preferable that the options be integrated at the end of the production line to avoid non-standard assembly too far upstream of the production line.

The rear opening may also include one or more of the following features:
 the free space is located between an upper panel and a lining of the main body;
 the device contained in the module includes a mobile aerodynamic blade and a motorized mechanism for actuating the mobile aerodynamic blade;
 the device contained in the module includes a motorized mechanism for opening and closing the rear opening;
 the module is adapted to be positioned in the free space through an opening provided facing the front of the motor vehicle when the rear opening is mounted on the motor vehicle;
 the module is adapted to be positioned in the free space through an opening overlooking the rear of the motor vehicle when the rear opening is mounted on the motor vehicle;
 the rear opening also includes a covering element capable of at least partially closing the opening provided at the rear of the main body;
 the lining and/or the upper panel on the one hand and the module on the other hand comprise means capable of allowing the module to be guided during its insertion into the free space;
 the lining and/or the upper panel on the one hand and the module on the other hand comprise means able to allow the placement of the module in the free space;
 the module includes means adapted to allow its attachment to a motor vehicle body;
 the module is open on its upper part;
 the module is waterproof;
 the module further comprises an element capable of allowing the connection between at least one wiring harness from the main body and at least one electrical circuit of the motor vehicle.

We will now present an embodiment of the invention given by way of non-limiting example and in support of the appended FIGS. in which.

Figure 1:
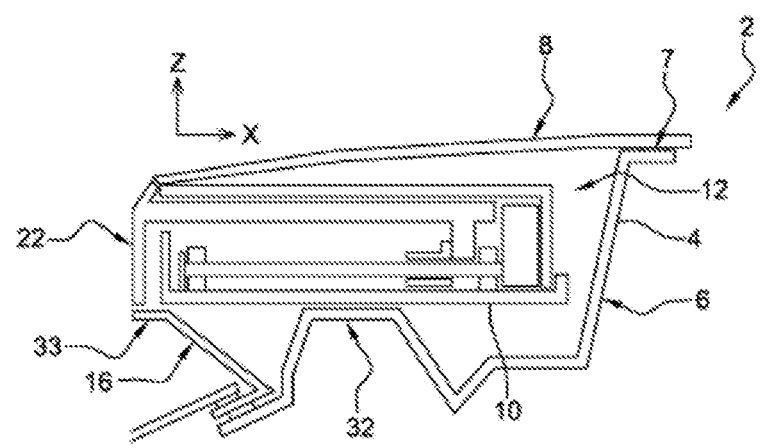
FIG. 1 is a sectional view of the upper part of a rear opening according to the invention.

Referring now to FIG. 1 showing an upper part of a rear opening 2 of a motor vehicle comprising a main body 4 comprising a lining 6 and an upper panel 8, and a module 10 removable from the main body 4, the body main 4 defining a free space 12 in which the module 10 can be positioned. A module is what is called a box in which various devices can be arranged such as a mobile aerodynamic blade or a motorized opening mechanism of the rear opening.

The upper part of the main body 4 can also be described as a "spoiler area."

The main body 4 can comprise, in addition to the lining 6 and the upper panel 8, other elements such as a lower panel, a lock, optical units, a rear window, etc.

Figure 2:
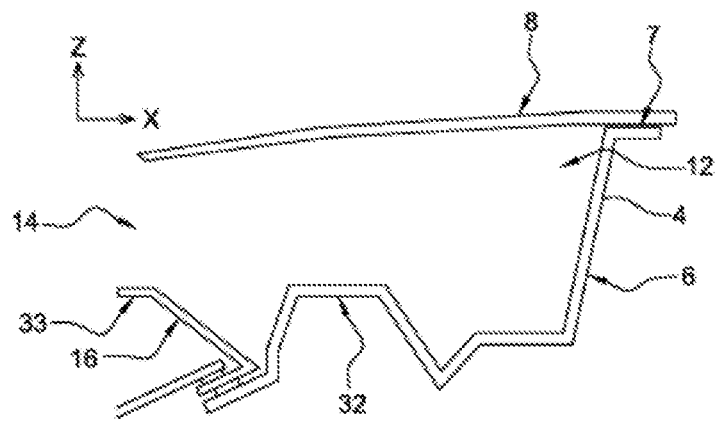
FIG. 2 is a sectional view of the upper part of the main body alone of FIG. 1.

In the example illustrated in FIGS. 1 and 2, it can be seen that the lining 6 and the upper panel 8 are connected to each other in a conventional manner by a bonding cord 7 (any other commonly used fixing means can also be considered). They can then delimit the free space 12 between them. It is also possible, as we will see later, that the free space 12 is not delimited jointly by the lining 6 and the upper panel 8 but only by one of these two elements (see for example FIG. 9).

The main body 4 also comprises an opening 14 through which it is possible to insert or remove the module 10 in the free space 12 when it is assembled in the rear opening or during repair work. The opening 14 is located here at the rear of the main body 4 (see FIG. 2). The concept of front and rear is understood here by reference to the usual orientation of motor vehicles. It is however conceivable, as we will see later, that the opening 14 allowing access to the free space is located at the front of the main body 4.

In the example shown in FIG. 2, the main body 4 may include a covering element 16 capable of at least partially closing the opening 14 of the main body 4 when the module 10 is placed inside the free space 12. The covering element in FIG. 2 (but also in FIGS. 5 and 6, which we will discuss later) is placed on the main body 4 before insertion of the module 10 inside the free space 12. It is alternatively possible for the covering element 16 to be attached to the main body 4 only after the module 10 has been placed in the free space 12 or possibly on the module 10, in order to facilitate the placement and a possible withdrawal of the module 10 thanks to a larger opening 14. In this case, the opening 14 through which the module 10 can be inserted can be considered as the available space giving access to the entrance to the free space 12 delimited between the upper panel 8 and the lining 6. It is then worthwhile envisioning means for fixing the covering element 16 to the main body 4 and potentially to the module 10, allowing a detachable fixing of the covering element. In the case shown in FIG. 2, a fixed attachment of the covering element 16 to the main body 4 is possible.

Figure 5:
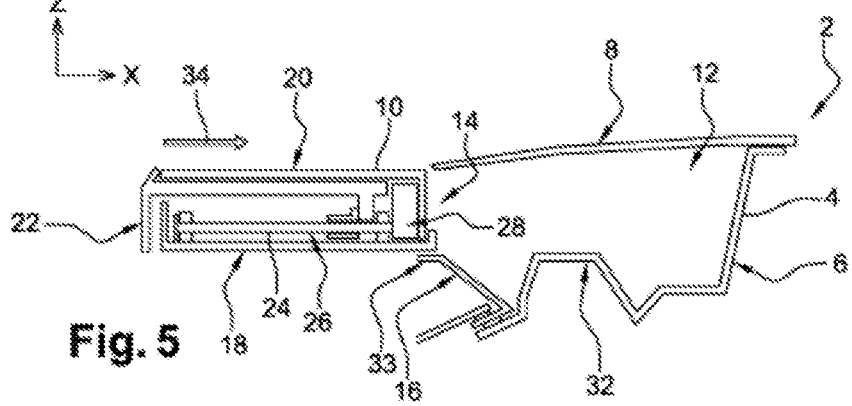
FIGS. 5 and 6 show a method of positioning the module of FIG. 3 inside the upper part of the main body of FIG. 2.
Figure 6:
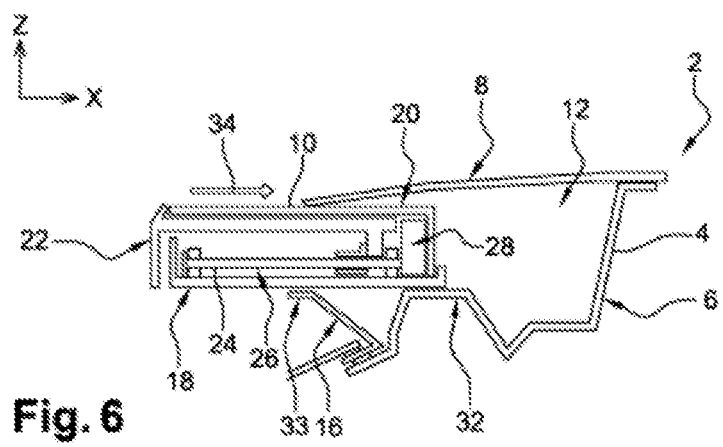

In the case illustrated in FIGS. 5 and 6, i.e. in which the covering element 16 is present on the rear opening before insertion of the module 10, the opening 14 can be considered as the space delimited between the upper panel 8 and the covering element 16 fixed to the main body 4.

It is also conceivable that the opening 14 is completely closed, after insertion of the module 10, by the covering element, which may be a third brake light removably attached to the rear opening. The third brake light can also be fixed to the module 10 in order to close off the opening 14 when the module 10 is inserted into the free space 12.

Figure 3:
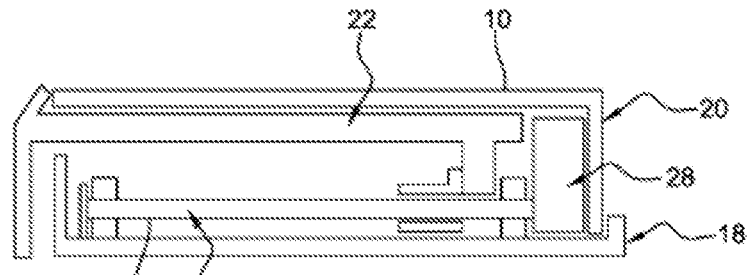
FIG. 3 is a sectional view of the module alone of FIG. 1.
Figure 4:
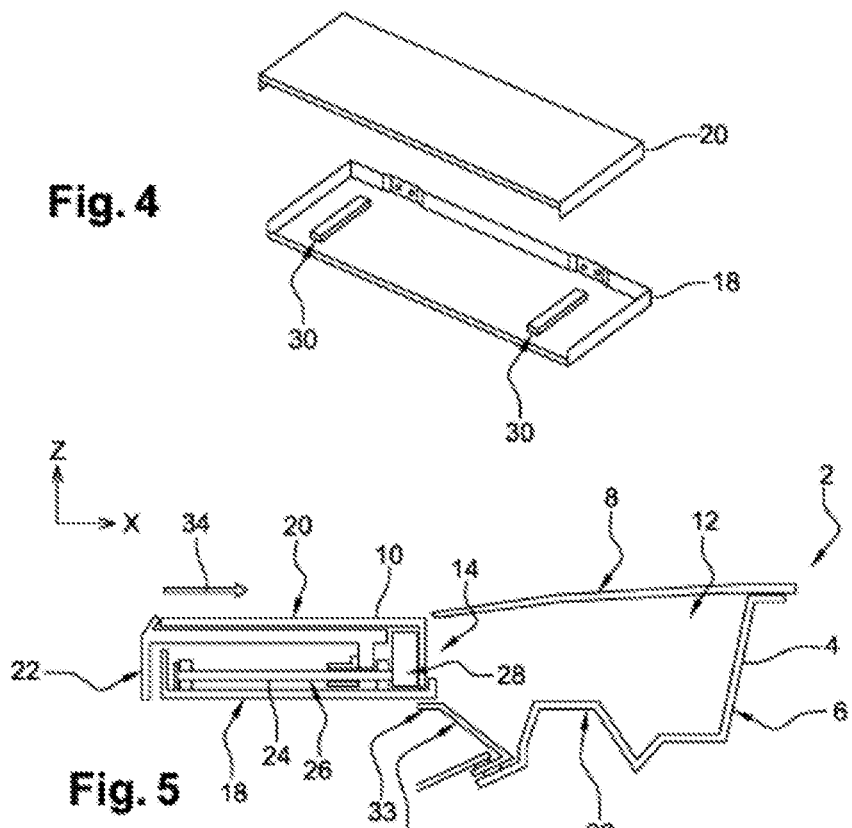
FIG. 4 is an exploded view of the module housing of FIGS. 1 and 3.

As shown in FIGS. 3 and 4, the module 10 can include a lower part 18 and an upper part 20. Alternatively, and as we will see later, it is possible that the module 10 includes only a lower part 18 and is open on its upper part, which avoids doubling the thicknesses in the rear opening 2 (upper part 20 in a double wall of the upper panel 8) and therefore reduces the space constraints in a relatively small space in addition to lightening the finished product. The upper part 20 and the lower part 18 can be connected to each other by means of reversible fixing means such as screws, clips, or any other means allowing disassembly without damage. This allows the module 10 to be opened if repair is necessary. Preferably, this fixing makes it possible to guarantee the sealing (for example, against humidity or dust to avoid intrusion of water or dust inside the module that can cause retention) of the module 10, for example using a joint.

The module 10 comprises in the example illustrated in FIGS. 1, 3, 5 and 6 a movable aerodynamic blade 22 and a motorized mechanism 24 for actuating the latter. The motorized mechanism 24 here comprises an endless screw 26 actuated by means of a motor 28. This reversible actuation allows the deployment and retraction of the mobile aerodynamic blade 22. As illustrated in FIGS. 1 and 6, the opening 14 (which in this case is the space delimited between the upper panel 8 and the covering element 16 fixed to the main body 4) is closed by one end of the mobile aerodynamic blade 22. We will see later that the motorized module can include other motorized mechanisms.

In order to facilitate the positioning of the module 10 inside the free space 12, the lining 6 and/or the upper panel 8 on the one hand and the module 10 on the other hand may include means capable of allowing guiding the motorized module 10 when it is positioned in the free space 12. In the example shown in FIG. 4, it may, for example, be rails 30 present on the lower external face 18 of the lower part 18 of the module 10 interacting with complementary rails (not shown) present at the lining 6. Any other means allowing such guidance can be envisioned, the aim being to have the module easily placed in its housing that will subsequently make it easier to hold it in position by the fastening elements. Guiding is also ensured by the recess 32 of the lining 6 illustrated in FIGS. 1, 2, 5 and 6, this recess 32 also contributing to the support of the module 10 when the latter is in position in the main body 4.

It is also possible that the lining 6 and/or the upper panel 8 on the one hand and the module 10 on the other hand include means able to allow the correct final positioning of the module 10 in the free space. These means make it possible to ensure the correct final positioning of the module 10 inside the main body 4, i.e. the module 10 is placed exactly at the place desired. It may, for example, be a stop in addition to the rails mentioned above. It could also be cone-shaped protrusions present on the module 10 or the lining 6 interacting with complementary cone-shaped recesses present on the one of the two elements that does not have protrusions. The shape of the walls of the opening 12 can also allow centering of the motorized module 10.

Once in position, the module 10 can be fixed to the lining 6 and/or to the upper panel 8 by means of reversible fixing means commonly used, such as screws. Different holes are then provided beforehand in terms of the module 10 and/or of the main body 4 in order to allow the fixing of the module 10 when the latter is in proper position inside the main body 4.

FIGS. 5 and 6 illustrate an example of a method for placing the module 10 inside the free space 12.

In the example shown, the covering element 16 is already present on the main body when the module 10 is put in place. As seen before, this is not necessarily the case. A flat part 33 of the covering element 16 located in the same plane as the recess 32 will then allow guidance at the start of positioning of the motorized module 10 in the free space 12, then 32 and 33 will be the module's support.

The module 10 is slid inside the main body 4 in a direction shown by the arrow 34. As explained before, this positioning can be facilitated by the presence of means for guiding the module 10 such as the rails 30 mentioned above.

The module 10 can then be kept in an optimal position and location thanks to the final positioning means mentioned above such as the conical protrusions and hollows described above. It is then possible to reversibly attach the module 10 to the main body 4 (to the lining and/or to the upper panel) as mentioned previously.

In the event of a malfunction of the module 10 or for any other reason requiring its removal from the main body 4, it is then possible to remove the reversible fasteners between the motorized module 10 and the main body 4 and then to remove the motorized module, an exit that can be made easier by the presence of the guide means. If the covering element 16 is removable, it can then be withdrawn before extraction from the motorized module 10 in order to give more freedom to the operator in charge of removing the motorized module 10.

Figure 7:
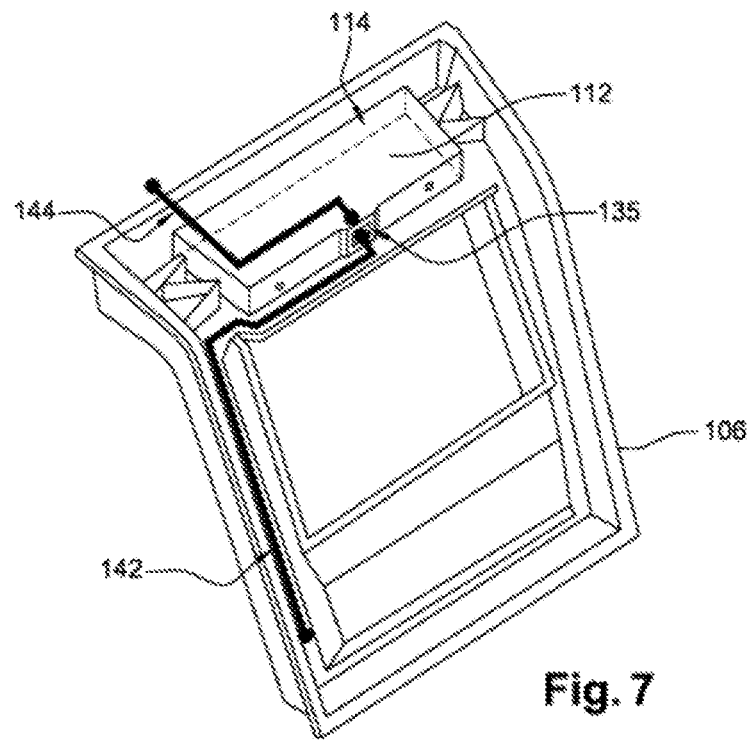
FIG. 7 is a perspective view of the main body of a rear opening according to one embodiment of the invention.
Figure 8:
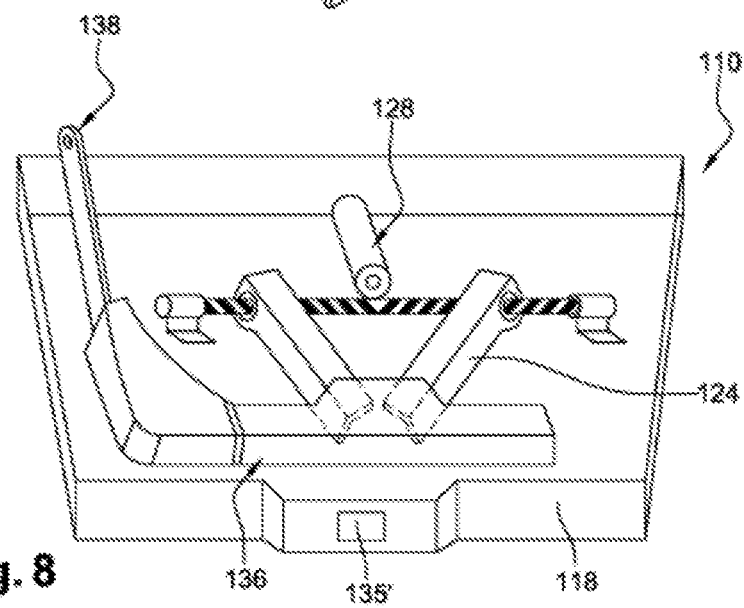
FIG. 8 is a top view of a module according to an embodiment of the invention.
Figure 9:
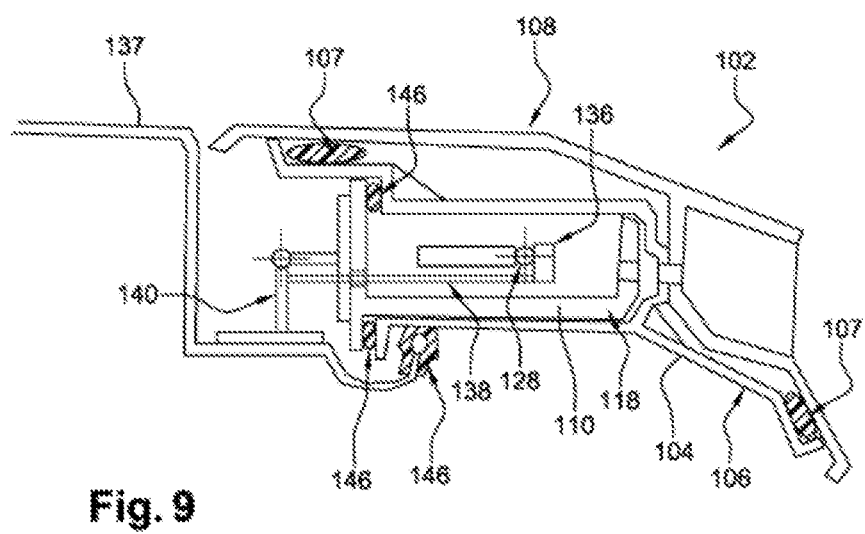
FIG. 9 is a sectional view of the upper part of the main body of FIG. 7 with the module of FIG. 8, the assembly forming the upper part of a rear opening according to one embodiment of the invention.

FIGS. 7 to 9, respectively, illustrate a lining 106, a module 110 and the upper part of a rear opening 102 according to an embodiment of the invention. This rear opening 102 is capable of opening and closing in a motorized manner.

The rear opening 102 comprises a main body 104 similar to the main body 4 in terms of the various elements composing it (lining 106, upper panel 108 bonded to the lining 106 by a bonding cord 107, lower panel, lock, optical units, etc.).

The main body comprises a free space 112 opening toward the front of the vehicle and accessible via an opening 114 oriented toward the front of the vehicle. As we explained before and can be seen in FIGS. 7 and 9, the module 110 is able to be positioned in the free space 112 through an opening 114 arranged in front of the main body 104. This positioning of the module at the front can have an advantage in terms of mounting the rear opening 102 on a body 137 of the vehicle. Indeed, instead of directly fixing the rear opening 102 to the body 137, which is a difficult step for an operator because of the weight and the large size of the rear opening 102 and the high position of the hinges, it is possible to first fix the module 110 to the body 137 and then guide and fix the main body 104 to the module 110. This makes it easier for the operator to use the module 110 as an assembly intermediary and also to handle lower-weight components. As an alternative to the presence of an opening at the front or rear of the main body, it is conceivable to have two openings at the front and rear, offering the operator multiple possibilities for installing the module 10 or 110.

In the example illustrated in FIGS. 7 and 9, and as said before, the free space 112 is here provided in the lining 106, which has a cavity adapted to accommodate the module 110 there (see FIG. 9) and no longer provided by the space remaining between the lining and the upper panel. Seals 146 can make it possible to seal the module 110 mounted on the rear opening.

The module 110 shown in FIG. 8 has some differences from the module 10. The module 110 is composed only of a lower part 118 and is open on its upper part in order to make it lighter and less obstructive as explained above. It includes a motorized mechanism 124 for opening the rear opening 102 comprising a motor 128. It is a standard mechanism for opening flaps of different weights. It may be a central mechanism 136 connected to a link arm 138 passing through the lower part 118 of the module 110, said link arm 138 being intended to be connected to a hinge 140 present on the body 137 as illustrated in FIG. 9. Of course, the module 110 could comprise, alone or simultaneously, another motorized mechanism, such as the one described in FIG. 3 intended to move a mobile aerodynamic blade.

The motorized module 110 comprising a motorized mechanism 124 for opening the rear opening 102 can be made of a material that can withstand the various stresses exerted on it during the opening and closing of the rear opening 102. In addition, the module 110, and more particularly the lower part 118, is made of materials allowing it to withstand stresses due to the opening of the rear opening.

The upper part 20 and lower parts 18 and 118 of the modules 10 and 110 can be manufactured by molding and be of different dimensions depending on the components and mechanisms to be mounted inside.

In addition to the various holes allowing the module 110 to be fixed and possible means for guiding and final positioning of the module 110 (holes and means identical to or different from those of FIGS. 1 to 6), the lining 106 may include a hole 135 allowing passage of elements capable of allowing the connection between at least one wiring harness 142 of the main body 4 and the module 110.

The module 110 in this case comprises at least one connector element 135' making it possible to connect at least one wiring harness 142 of the main body 104 to at least one electrical circuit 144 of the motor vehicle. This is applicable to module 10 and makes it possible to centralize the electrical connections, which simplifies the work of the operator. It can be a plug type element, an element allowing an induction type contact, or any other element making it possible to easily connect two elements in order to ensure electrical continuity when the system is powered. This element can also be present on the motorized module 10.

The installation and removal of the motorized module 110 in the main body 104 are similar to that of the motorized module 10 in the main body 4 with the exception that it is conceivable to initially have the motorized module 110 on the body 137 of the motor vehicle, then the main body 104 on the motorized module 10. Also, there is a step of connecting the link arm 138 to the hinge 140 of the body 137.

The invention is not limited to the embodiments presented and other embodiments will be apparent to the person skilled in the art.

In particular, it is possible to incorporate into the motorized module different elements such as radars, sensors, an antenna, the third brake light, a vortex generator, etc.

NOMENCLATURE

1st Embodiment

2: rear opening
4: main body

6: lining
7: bonding cord
8: upper panel
10: motorized module
12: free space
14: opening
16: covering element
18: lower part
20: upper part
22: mobile aerodynamic blade
24: motorized mechanism for activating the mobile aerodynamic blade
26: endless screw
28: motor
30: rails
32: recess
33: flat part of the covering element
34: direction of insertion of the motorized module 2nd Embodiment 102: rear opening
104: main body
106: lining
107: bonding cord
108: upper panel
110: motorized module
112: free space
114: opening
118: lower part
124: motorized mechanism for opening the rear opening
128: motor
135: connection hole
135': connector element
136: central mechanism
137: vehicle body
138: link arm
140: hinges
142: main body wiring harness
144: vehicle wiring harness
146: seals

The invention claimed is:

1. A rear opening of a motor vehicle comprising:
a movable main body, and
a module removable from the movable main body adapted to receive a device, the movable main body including a free space accessible through an opening, the free space and the opening being sized to allow inserting and removing the module from the movable main body,
wherein the free space is located between an upper panel and a liner of the movable main body.

2. The rear opening of claim 1, wherein the device contained in the module comprises a movable aerodynamic blade and a motorized actuating mechanism of the movable aerodynamic blade.

3. The rear opening of claim 1, wherein the device contained in the module comprises a motorized mechanism for opening and closing the rear opening.

4. The rear opening of claim 1, wherein the module is adapted to be positioned in the free space through an opening arranged facing a front of the motor vehicle when the rear opening is mounted on the motor vehicle.

5. The rear opening of claim 1, wherein the module is adapted to be positioned in the free space through an opening on the rear of the motor vehicle when the rear opening is mounted on the motor vehicle.

6. The rear opening of claim 5, wherein the rear opening further comprises a covering element capable of at least partially closing the opening provided at the back of the movable main body.

7. The rear opening of claim 1, wherein the liner and/or the upper panel on the one hand and the module on the other hand are structured to guide the module during its insertion into the free space.

8. The rear opening of claim 1, wherein the liner and/or the upper panel on the one hand and the module on the other hand are structured to facilitate placement of the module in the free space.

9. The rear opening of claim 1, wherein the module is adapted to allow its attachment to a motor vehicle body.

10. The rear opening of claim 1, wherein an upper part of the module is open.

11. The rear opening of claim 1, wherein the module is sealed.

12. The rear opening of claim 1, wherein the module further comprises an element adapted to allow connection between at least one wire harness of the movable main body and at least one electrical circuit of the motor vehicle.

* * * * *